Patented June 1, 1937

2,082,426

UNITED STATES PATENT OFFICE 2,082,426

PROCESS OF PRESERVING THE NATURAL PROPERTIES OF FRUIT, VEGETABLE AND SIMILAR JUICES

Edwin Schoop, Rheinfelden, near Basel, Switzerland

No Drawing. Application December 1, 1934, Serial No. 755,630. In Switzerland December 5, 1933

6 Claims. (Cl. 99—155)

It is a recognized fact that juices of fruits, vegetables and other plants can only be regarded to be of the highest grade, if their natural properties remain unaltered. Hence the preservation of the natural properties of such juices becomes desirable.

Most of the juices in the trade cannot be compared, in regard to their properties, with juices freshly prepared from fruit, plant or the like. This is due to the premature loss of flavour, taste and colour, all disadvantages which frequently take place soon after leaving the final manufacturing stage. It is, therefore, justified to assume that thus far the juice manufacturing methods were lacking adequate treatment.

Attempts have been made to overcome these difficulties by heating the raw juice to various temperatures in order to secure flocculence of the reversible colloids (vegetable gums, albuminous matter and pectin bodies). However, the heating process does not answer the purpose, for the juices acquire a flavour different from that of the fresh products and quite frequently a cooked taste and a darker colour.

Attempts have also been made to produce pure, natural juices by immediately cooling down the juice to a low temperature from the moment it flows from the press in order to make possible the removal of bacteria by filtration. This process has been found to involve great difficulties owing to the fact that many juices cannot be freed from bacteria even if their temperature is brought to the neighbourhood of the freezing point. It can be anticipated with certainty that the filter layers will become choked often shortly after starting with the filtration, owing to the gummy and mucilaginous nature of most juices.

A further disadvantage of the low temperature process is that valuable components of the juice, contributary to the flavour thereof are retained by the filter layer or filter mass, even if timely precautions were taken to avoid resinification and oxidation of the flavouring bodies, whilst the colloids and other turbidities are still suspended in the raw juice.

Further it has been proposed to manufacture orange and citrus juices by addition of inconsubstantial acids, such as hydrochloric acid, and proteolytic enzyms, such as peptase, papain and pepsin, and subsequent precipitation of the juice proteids by means of a heating operation. By the action of said enzyms and with the aid of inconsubstantial acids (hydrochloric acid) and heat, the flavouring bodies are destroyed and the juice becomes tasteless or flat.

Finally it may also be stated that the known addition of chemical preservatives invariably results in a substantial change of the natural properties of the juice.

Thus all the foregoing processes have failed to the point of preserving the natural properties of a juice before or after it has been stored or bottled.

It is known that the flavouring bodies of the juices are of a labile nature as long as they remain associated with the colloids and other juice turbidities. Owing to the lability of the flavouring bodies, these will be unfavourably affected as soon as the micro-organisms of the air have access to the juice whilst in preparation. These atmospheric bacteria, in fact, cause a chemical change in all juices, for they settle on the colloids which forthwith deprive the juices of any such constituents which should remain in the juice for retention of flavour and taste. This undesirable microbiological process finds support by the free access of atmospheric oxygen.

For example, the juice just squeezed from apples alters its colour after a short time even if care is taken that this juice flows into glass containers. This change of colour is due to oxidation which sets in immediately. It is caused by the access of atmospheric oxygen. The resinification caused by atmospheric bacteria is not visible to the eye but can be detected by the alteration of the flavour. In the instance of bright, particularly yellow juices, the effect of the oxidation process becomes visible to the naked eye, whereas the oxidation of red or darker juices can be followed up only by the refractometer.

The oxidation and resinification have, therefore, a considerable influence on the qualitative properties of a juice. The more intensive these symptoms the more difficult are the subsequent operation of filtering the liquid and its freeing from bacteria. It is, therefore, highly desirable to prevent, or at least to restrict, the oxidation and resinification.

It is the object of the present invention to avoid the oxidation of a juice at the time when it leaves the press and to prevent the resinification of the colloids with the esters, and also to precipitate such nucleus at their inception. Thereby is attained an important technical progress.

The procedure in accordance with the invention is as follows:—

The raw juice which is more or less contaminated with atmospheric bacteria is placed into a container previously subjected to reduced pressure, and is inoculated with a dilute solution of sodium chloride, advantageously of ¼–1 per cent strength; the quantity of the sodium chloride solution may vary, according to the constitution of the juice, from 0.5-6 litres per 100 litres of raw juice. No heating or cooling operation, nor any addition of inconsubstantial acids are to be applied during this pre-treatment. The said pre-treatment fulfills the purpose of preventing oxidation and resinification and of bringing the mucilaginous bodies to the required degree of homogeneity with the starchy bodies, for their assimilation is only a relative one. A satisfactory preliminary separation of the different bodies is thus attained. This intermediate stage of the separation process is advantageously performed with the aid of suitable centrifugal action.

The juice once being freed from the greater part of the turbidities is then submitted to a hydrolytic inversion without applying heat of any kind. This is achieved by adding to the centrifugal liquid a vegetable juice having peptonizing properties, such as a juice with simultaneous pectose and peptose action. In other words this addition fulfills the purpose of effectively separating, by co-enzymatic action, any vegetable matter previously subjected to coagulation. As vegetable juices having such properties, there have proved to be useful, for example, the juice of the pawpaw fruit (Carica papaya), pineapple juice (Ananas sativa), as well as all other plant juices of the bromeliaceae family. The action of such plant juices is surprising. In fact, if a juice lacks sufficient selfhydrolyzation, an addition of 3-9 per cent of this plant juice will bring it within 24 to 48 hours to clearness by centrifugal action. The effect of centrifuging can further be improved by adding to the juice some ground filter paper.

These stages of the treatment should advantageously be conducted with complete exclusion of air in order to avoid fresh infection by atmospheric bacteria.

Finally, the juice is subjected to conventional clarification by filtration through a clarifying filter and thereafter a sterilizing filter. These operations are also conducted under exclusion of air.

If necessary, the juice may be thickened or concentrated in any known way under exclusion of air, but without applying any heat.

The following examples illustrate the invention:—

Example 1

From 10 kilos of tomatoes there are obtained 6 litres of juice, which has been freed from solid matter by screening through a sieve. During this procedure there are added to the juice 45 cc. of a solution of sodium chloride of 1 per cent strength and the whole is then allowed to stand for about 2 hours in an exhausted container. Any air in the juice is displaced by mechanical agitation. The tomato juice is then mixed with 95 cc. of pawpaw juice, whilst maintaining the exclusion of air. Then the liquid is left for about 25 hours in a room having a temperature of 8° C., being thoroughly shaken during the second, fourth and sixth hour. After the time indicated has elapsed, the liquid can then be centrifuged and clarified by filtration. To clear the juice so obtained it is finally freed from fermentative matter by means of a sterilizing filter.

Example 2

10 kilos of oranges yield 3 litres of juice, which is mixed with 18 cc. of a solution of sodium chloride of 0.4 per cent strength. After the liquid has been allowed to stand for 2 hours with complete exclusion of air it is centrifuged for the first time. After this treatment air, which is still present in the juice, is displaced by mechanical agitation. There are then added directly to the juice 125 cc. of pawpaw juice and the whole is allowed to stand for a certain time. The liquid is then centrifuged and finally clarified and freed from bacteria by filtration.

Example 3

The juice from 10 kilos of pineapples of the Cayenne type is inoculated with 38 cc. of a solution of sodium chloride of 1 per cent strength. The procedure is otherwise as described in Example 1.

In order to enhance the peptonizing action of the enzymatic bodies of the pineapple juice there is added 0.01 gram of bromelin. After this has been allowed to act on the liquid the latter is centrifuged, clarified and freed from bacteria.

Example 4

The juice obtained by pressing yellow carrots, if necessary after filtration, is inoculated with a solution of sodium chloride of 1 per cent strength. The further treatment is as described in Example 1. The pineapple juice is added and after some time the whole is subjected to centrifuging. The subsequent clarification by filtration and the removal of bacteria can be performed without difficulty.

What I claim is:—

1. A process of stabilizing fruit, vegetable and similar juices against alteration in the natural properties thereof, comprising the steps of first hydrolyzing all proteolytic, mucilaginous and gummy matter by the infusion of the raw juice with a dilute solution of sodium chloride of at most one per cent strength, and subsequently removing the hydrolyzed matter by the incorporation of a juice obtained from a plant selected from the group consisting of bromeliaceae and caricaceae and having peptonizing properties in the absence of acids foreign to the juice, said process being carried out wholly without thermal treatment.

2. A process of stabilizing fruit, vegetable and similar juices against alteration in the natural properties thereof, comprising the steps of first hydrolyzing all proteolytic, mucilaginous and gummy matter by the infusion of the raw juice with a dilute solution of sodium chloride of at most one per cent strength, and subsequently removing the hydrolyzed matter by the incorporation of a juice obtained from a plant selected from the group consisting of bromeliaceae and caricaceae and having pectose and peptose properties in the absence of acids foreign to the juice, said process being carried out wholly without thermal treatment.

3. A process of stabilizing fruit, vegetable and similar juices against alteration in the natural properties thereof, comprising the steps of first hydrolyzing all proteolytic, muscilaginous and gummy matter by the infusion of the raw juice with a dilute solution of sodium chloride of at most one per cent strength, and subsequently removing the hydrolyzed matter by the incorporation of a plant juice of the family of the bromeliaceae in the absence of acids foreign to the juice, said process being carried out wholly without thermal treatment.

4. A process of stabilizing fruit, vegetable and similar juices against alteration in the natural properties thereof, comprising the steps of first hydrolyzing all proteolytic, mucilaginous and gummy matter by the infusion of the raw juice with a dilute solution of sodium chloride of at most one per cent strength, and subsequently removing the hydrolyzed matter by the incorporation of bromelin in the absence of acids foreign to the juice, said process being carried out wholly without thermal treatment.

5. A process of stabilizing fruit, vegetable and similar juices against alteration in the natural properties thereof, comprising the steps of first hydrolyzing all proteolytic, mucilaginous and gummy matter by the infusion of the raw juice with a dilute solution of sodium chloride of at most one per cent strength, and subsequently removing the hydrolyzed matter by the incorporation of a juice obtained from a plant selected from the group consisting of bromeliaceae and caricaceae and having peptonizing properties in the absence of acids foreign to the juice, said process being carried out wholly without thermal treatment, as well as with exclusion of air and while removing air from the juice.

6. A process of stabilizing fruit, vegetable and similar juices against alteration in the natural properties thereof, comprising the steps of first hydrolyzing all proteolytic, mucilaginous and gummy matter by the infusion of the raw juice with a dilute solution of sodium chloride of at most one per cent strength, and subsequently removing the hydrolyzed matter by the incorporation of a juice obtained from a plant selected from the group consisting of bromeliaceae and caricaceae and having peptonizing properties in the absence of acids foreign to the juice, said process being carried out wholly without thermal treatment, and concentrating the resultant juice while excluding air and without heat.

EDWIN SCHOOP.